Feb. 19, 1924.
M. SEVERSON
CRANK HOLDER FOR CARS
Filed March 26, 1923
1,484,341
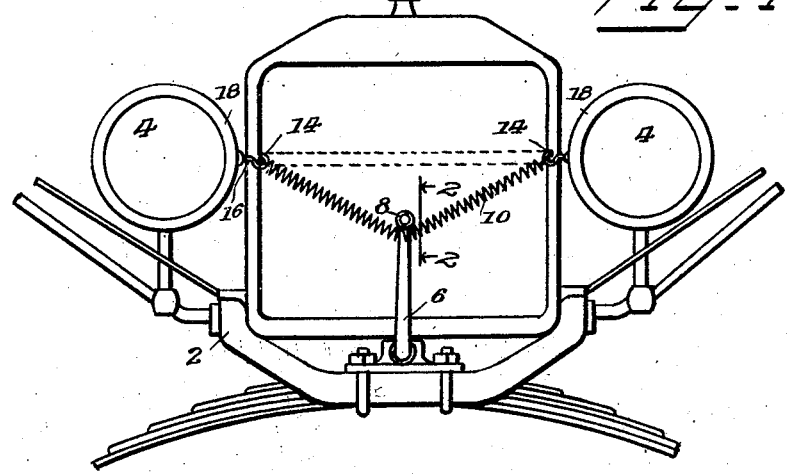
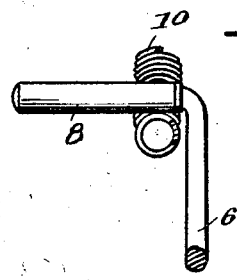
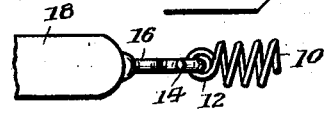
Inventor
M. Severson.
By Jacoli & Jacoli
Attorneys Patented Feb. 19, 1924.

1,484,341

UNITED STATES PATENT OFFICE.

MARTIN SEVERSON, OF GALESVILLE, WISCONSIN.

CRANK HOLDER FOR CARS.

Application filed March 26, 1923. Serial No. 627,900.

*To all whom it may concern:*

Be it known that I, MARTIN SEVERSON, a citizen of the United States, residing at Galesville, in the county of Trempealeau and State of Wisconsin, have invented certain new and useful Improvements in Crank Holders for Cars, of which the following is a specification.

This invention relates to a starting crank holder for motor vehicles, and particularly to a holder which, while simple and inexpensive, in construction, will effectually maintain the crank in an elevated position, against unusual jars and vibrations.

In addition to the feature just stated, the device comprises a construction which may be readily adapted for use with the Ford head-lamps of usual construction.

Other features and advantages will appear upon reference to the accompanying specification.

In the drawings

Figure 1 is a front elevation of an automobile showing the application of my device thereto;

Figure 2 is a side elevation of a portion of the starting crank on the line 2—2 of Figure 1, and Figure 3 is a detail plan view of one end of the holding spring, and illustrating its manner of attachment to the head-lamp rim.

Referring now more specifically to the accompanying drawings, which illustrate the application of my invention to a vehicle of the Ford type, 2 indicates generally the frame, 4 the head-lamps and 6 the usual hand motor starting crank, the handle or gut being indicated at 8.

The crank holder comprises a tension coil spring 10 formed at each end with an eye 12, to receive the hook 14 of a studbolt 16 which is adapted to be passed through the lens securing rim 18 of the head-lamps.

As is common in Ford head-lamp construction, the lens rim is provided with a peripheral series of rivets and I have found that the studbolt 16 here shown, may conveniently be substituted for one of these rivets on the rims of the opposite head-lamps.

One of the features of the present invention resides in the fact that, if for any reason it is desired to dispense with the holder, it may be readily removed without marring the condition or appearance of the vehicle.

While reference to the drawings clearly shows the construction and operation of the holder, it might be stated that when the operator is not using the crank, 6, the tension coil, spring is distended from its normal position shown in dotted lines in Figure 1, so that the central portion may be moved under the hand gut 8, as shown in Figure 2, the crank having been moved to a vertical position as shown. The tension of the spring will then maintain the crank in inoperative position against unusual vibrations.

What I claim as new is as follows:

1. A starting crank holder comprising a coil tension spring and means at its ends for respectively connecting with the head-lamps upon each side of the vehicle.

2. A starting crank holder comprising a coil tension spring provided with an eye at each end and means connected with each eye for detachably securing the spring to the head-lamps of the vehicle.

3. In a device of the class described, in combination with the head-lamps of the vehicle having a lens-holding rim a hook rigidly secured to said rim, a crank holder comprising a coil tension spring and means at the ends of said spring for connecting respectively with the hooks on the head-lamp rims.

In testimony whereof I affix my signature.

MARTIN SEVERSON.